United States Patent

Sardo et al.

[11] Patent Number: 5,956,834
[45] Date of Patent: Sep. 28, 1999

[54] AUTOMOBILE HEADLINER REPAIR SYSTEM

[76] Inventors: Carmine Charles Sardo; Carmine Charles Sardo, Jr., both of 2478 Arrow Highway #106, La Verne, Calif. 91750

[21] Appl. No.: 08/943,605

[22] Filed: Oct. 3, 1997

[51] Int. Cl.⁶ .................................................. B23P 6/00
[52] U.S. Cl. ...................... 29/402.15; 296/214; 24/298
[58] Field of Search ..................................... 224/311, 314; 296/214; 24/298, 302; 29/402.09, 402.14, 402.15

[56] References Cited

U.S. PATENT DOCUMENTS

| | | | |
|---|---|---|---|
| 1,270,494 | 6/1918 | Christiansen . | |
| 2,118,563 | 5/1938 | Mackay | 296/137 |
| 2,194,902 | 3/1940 | Huer | 296/214 |
| 3,379,469 | 4/1968 | Elia | 296/214 |
| 3,583,613 | 6/1971 | Gish | 224/314 |
| 4,275,919 | 6/1981 | Okamoto et al. | 296/214 |
| 4,971,388 | 11/1990 | Knaggs | 296/214 |
| 5,433,571 | 7/1995 | Allison | 411/508 |
| 5,467,507 | 11/1995 | Marsh et al. | 24/298 |
| 5,624,151 | 4/1997 | Guswiler | 296/214 |

*Primary Examiner*—S. Thomas Hughes
*Assistant Examiner*—Steven A. Blount
*Attorney, Agent, or Firm*—Goldstein & Canino

[57] ABSTRACT

A headliner repair system for repairing a sagging headliner in an automobile, comprising a pair of anchors attached with a tether. The anchors comprise a flange having a center, and a screw extending from the center of each flange. The tether is rope-like, has two ends which each have a loop. One of the anchors is secured to the headliner, trapping one of the loops around one of the screws, and between the flange and headliner. The other anchor is pulled across the headliner, to tension the tether against the headliner, and is then secured to the headliner. The headliner between the anchors is thus supported by the tensioned tether.

3 Claims, 2 Drawing Sheets

AUTOMOBILE HEADLINER REPAIR SYSTEM

BACKGROUND OF THE INVENTION

The invention relates to an automobile headliner repair system. More particularly, the invention relates to a system for securing to a sagging automobile headliner, and raising the sagging material to a higher position, where it is held parallel to the roof, the heads of the occupants.

In automobile terminology, the aesthetic treatment decorating the under surface of the passenger compartment roof is traditionally called "the headliner". Throughout the years, most American automobiles have had a nylon, vinyl, or fabric headliner. The fabric is stretched over a corrugated cardboard or foam backing and is often secured along the edges of the passenger compartment and/or glued to the backing.

In time, the fabric stretches under its own weight, the glue releases after years of hot and cold weather, and for other reasons, the headliner begins to separate from the backing. Once free from the backing, the headliner begins to sag downward. The sagging is most severe in the center of the passenger compartment.

A sagging headliner provides the automobile with an unsightly appearance. What would otherwise seem to be a well maintained car, seemingly becomes a "junker" because of the sagging headliner. A sagging headliner is also uncomfortable for the occupants. Most people find it unpleasant to have the headliner rest against the tops of their heads. In addition, a sagging headliner can be a safety hazard. Many headliners sag so low that they interfere with the driver's field of vision.

To date, the most common cure for a sagging headliner is removal, and replacement with a new headliner. Replacement of a simple vinyl headliner can cost several hundred dollars. Replacement of a headliner made of an exotic material can cost even more.

U.S. Pat. No. 5,433,571 to Allison discloses a button fastener for securing a headliner. Allison is a button that is intended to be pressed into the headliner at numerous locations, to "pin up" the headliner. To be effective Allison requires that numerous buttons be employed across the length and width of the headliner. Such a multitude of buttons is as unsightly as the sagging headliner itself.

U.S. Pat. No. 5,624,151 to Guswiler discloses a headliner retainer, which comprises a series of telescoping, semi-rigid strips, which extend across the width of the automobile. Guswiler is a structure intended to adjust to the width of the automobile interior and create a friction fit against the headliner to prevent it from sagging. Even fully collapsed, Guswiler is a large apparatus which requires skill for assembly and installation.

U.S. Pat. No. 4,971,388 to Knaggs discloses a headliner support which comprises a flexible strip that extends fully across the headliner, and attaches into the side moldings that are present on some automobiles.

While these units may be suitable for the particular purpose employed, or for general use, they would not be as suitable for the purposes of the present invention as disclosed hereafter.

SUMMARY OF THE INVENTION

It is an object of the invention to produce an automobile headliner repair system which reduces or eliminates sagging of the headliner in an automobile.

It is another object of the invention to provide an automobile headliner repair system which is inexpensive to manufacture, and is small for compact and inexpensive packaging.

It is a further object of the invention to provide a automobile headliner repair system which employs a pair of anchors, each anchor capable of penetrating the headliner and anchoring into the backing material. The anchors are connected with a tether cord. The tether cord lifts the headliner between the two anchors.

The invention is a headliner repair system for repairing a sagging headliner in an automobile, comprising a pair of anchors attached with a tether. The anchors comprise a flange having a center, and a screw extending from the center of each flange. The tether is rope-like, has two ends which each have a loop. One of the anchors is secured to the headliner, trapping one of the loops around one of the screws, and between the flange and headliner. The other anchor is pulled across the headliner, to tension the tether against the headliner, and is then secured to the headliner. The headliner between the anchors is thus supported by the tensioned tether.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
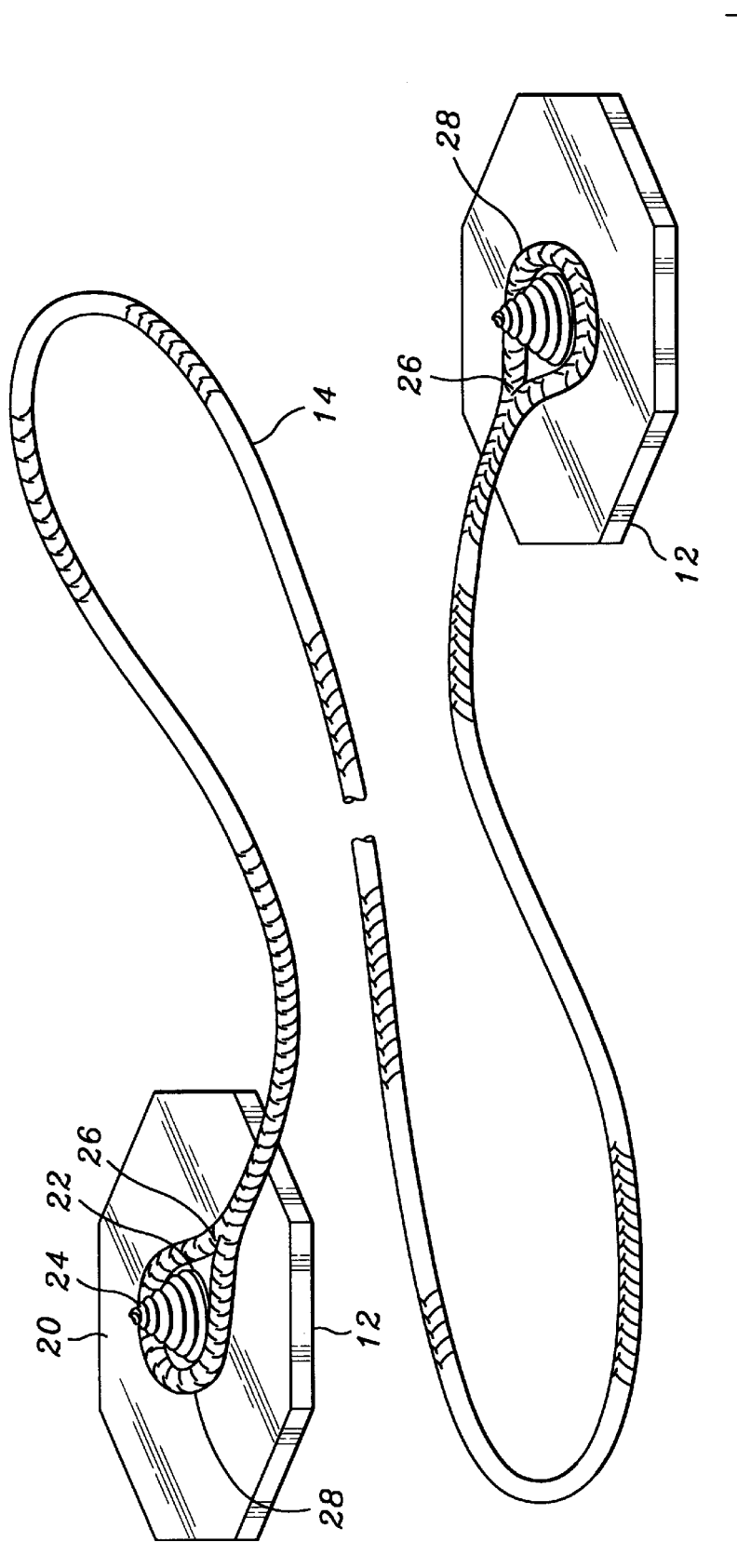
FIG. 1 is a diagrammatic perspective view, illustrating the invention per se.

FIG. 1 illustrates a headliner repair device 10, comprising a pair of anchors 12 and a tether 14.

Figure 2:
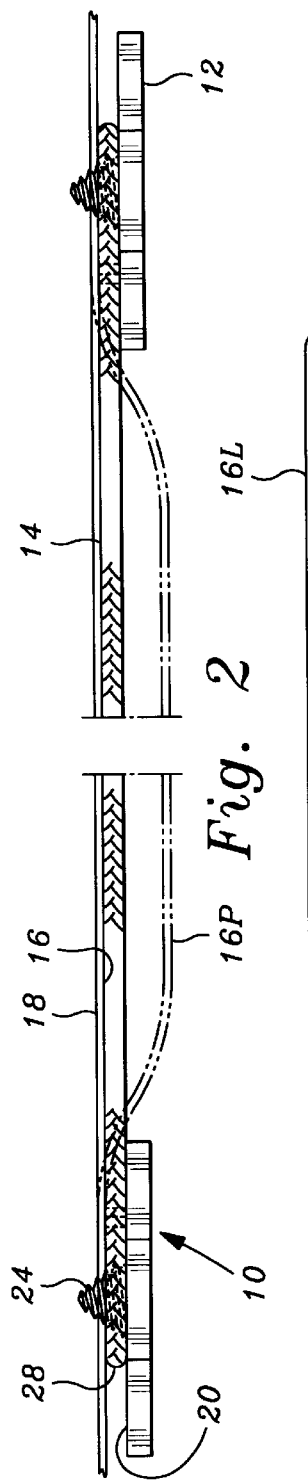
FIG. 2 is a side elevational view, illustrating the invention in place, lifting a sagging headliner.

Referring momentarily to FIG. 2, an automobile has a headliner 16 and a backing 18. A sagging headliner 16P is illustrated in phantom, and indicates a position for the headliner 16 before application of the headliner repair device 10.

The anchors 12 comprise a flange 20 having a center 22, and a screw 24 extending from the center. The screw 24 is preferably a helical screw. In general, the screw 24 may be any device capable of penetrating the headliner 16 and backing 18 and holding fast within the backing.

The tether 14 has two ends 26. A loop 28 is present at each of the ends 26 of the tether 14. Each loop 28 extends around the screw 24 on one of the anchors 12. The loops 28 may be affixed to the flange 20 with a light adhesive, not to provide structural strength during use, but to hold the loop 28 in place prior to, and during installation of the headliner repair device 10.

The tether 14 is rope like and preferably made of a braided elastic material, similar to a bungee cord. A solid rubber cord, or any other flexible, rope-like material may be used for the tether 14.

Referring to FIG. 2, in operation, One of the anchors 12 is secured to the headliner 16 and backing 18, by turning the anchor 12, and urging the screw 24 up against the headliner 16 until the screw penetrates the headliner 16 and backing 18 and the flange 20 fits tightly against the headliner 16, trapping the loop 28 between the headliner 16 and flange 20.

Next, the other anchor 12 is brought across the headliner, tensioning the tether 14 across the headliner 16 to lift the headliner 16. Said anchor 20 is then secured to the headliner and backing, lifting the sagging headliner between the two anchors 12 with the tether 14.

Figure 3:
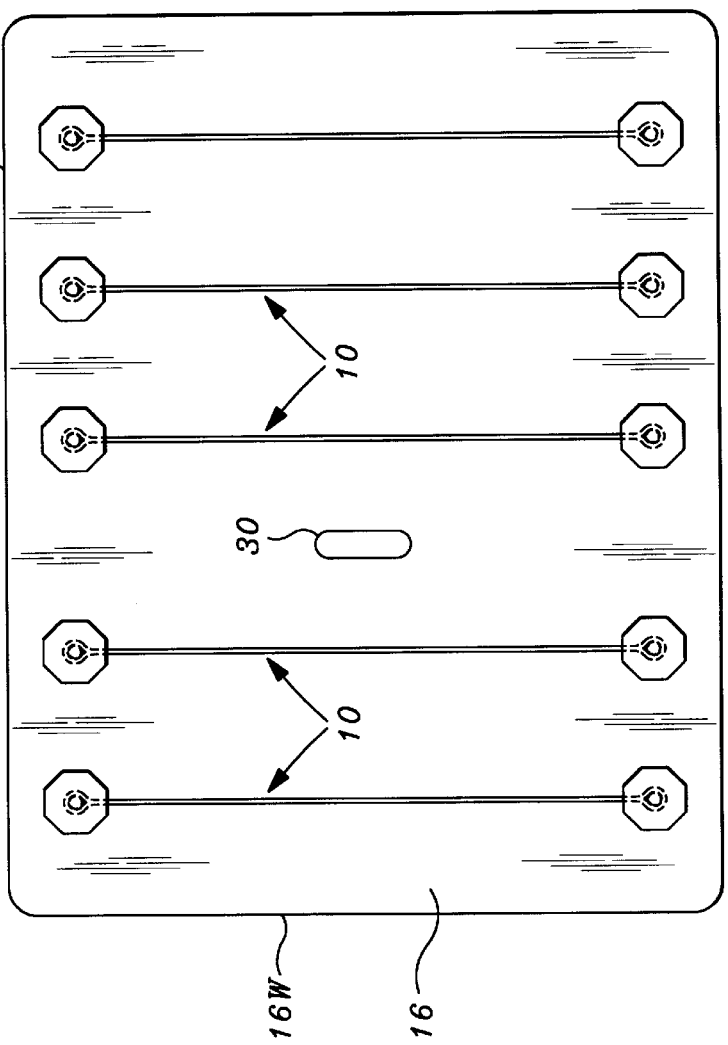
FIG. 3 is a bottom plan view of an automobile headliner, illustrating several headliner repair devices according to the present invention installed in place, lifting the headliner.

Referring to FIG. 3, the headliner 16 is shown in bottom plan. For reference purposes, a dome light 30 is shown. The headliner 16 has a width 16W and a length 16L. Typically an automobile passenger compartment dictates that the headliner is approximately four to six feet wide, and between five and seven feet long. Thus, the tether would typically be in the range of two to five feet, according to the particular purposes employed. As illustrated in FIG. 3, several headliner repair devices 10 have been extended across the width 16W of the headliner 16. However, the headliner repair devices 10 might alternately be stretched along the length of the headliner 16. A handful of headliner repair devices 10 are sufficient to support a headliner, and effectively solve the sagging problem.

In conclusion, herein is presented a headliner repair system which employs headliner repair devices having a pair of anchors and a tether between the anchors. The anchors are secured to the headliner, and the tether supports the headliner therebetween and prevents it from sagging. Thus, an effective solution is provided which eliminates the need to replace the headliner.

What is claimed is:

1. A headliner repair method, using a device having a pair of anchors and a rope-like tether connected between the anchors, for repairing a sagging headliner, comprising the steps of:

securing one of the anchors into the headliner;

tensioning the tether agains the headliner by pulling the other anchor across the headliner; and securing said other anchor into the headliner with the tether supporting the headliner between the anchors.

2. The headliner repair method as recited in claim 1, wherein the anchors further comprise a flange having a center, and a screw extending from the center, and the step of securing one of the anchors into the headliner further comprises:

screwing the anchor into the headliner.

3. The headliner repair method as recited in claim 2, wherein the tether further has two ends and has a loop on each of the two ends, and wherein the step of securing one of the anchors into the headliner further comprises:

extending the loop around the screw; and trapping the loop between the flange and headliner.

\* \* \* \* \*